July 29, 1947.  S. H. RESCH  2,424,708
TELESCOPE MOUNT
Filed June 13, 1945  3 Sheets-Sheet 1
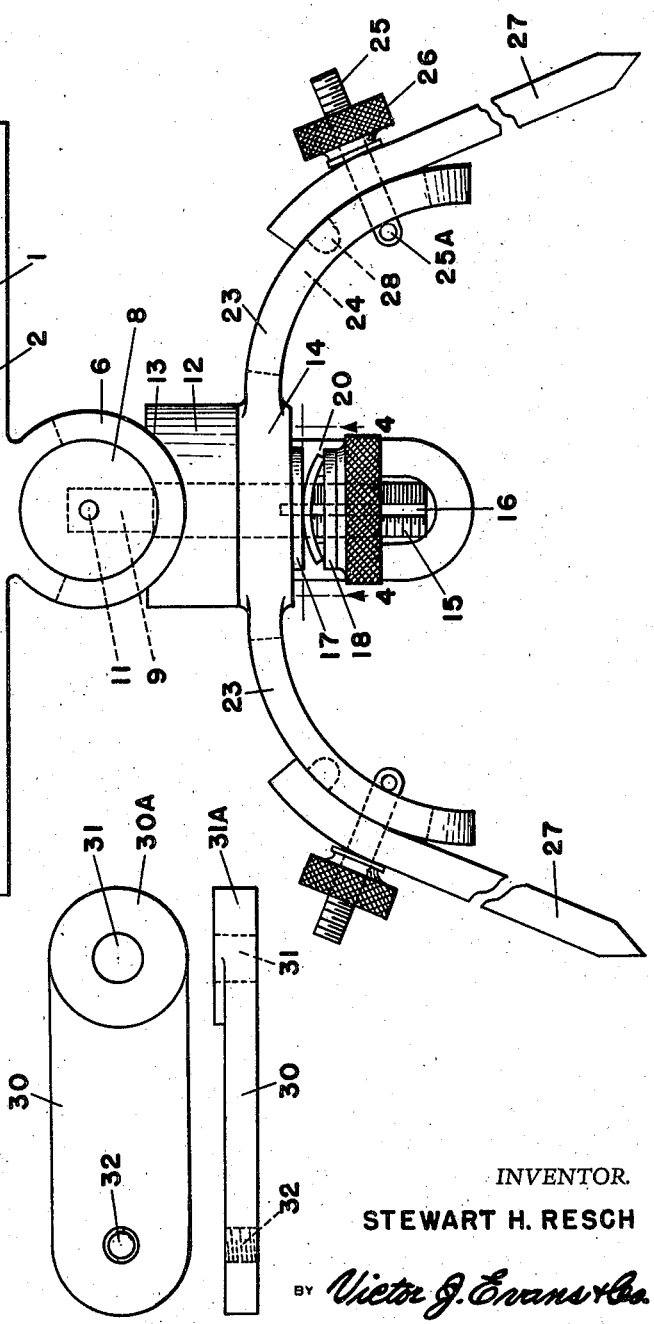
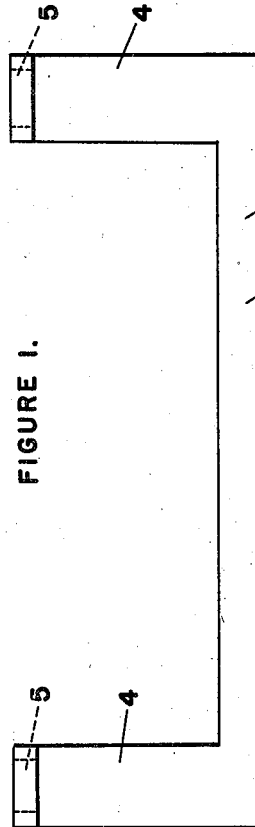
INVENTOR.
STEWART H. RESCH
BY *Victor J. Evans & Co.*
ATTORNEYS

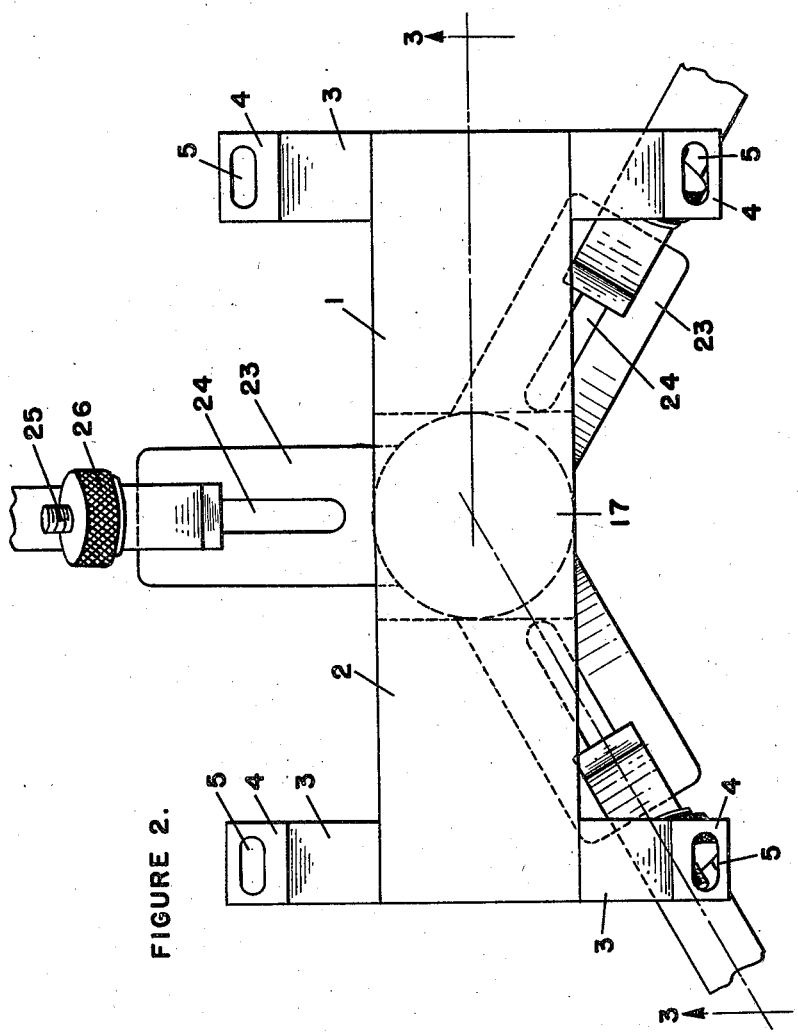

July 29, 1947.  S. H. RESCH  2,424,708
TELESCOPE MOUNT
Filed June 13, 1945  3 Sheets-Sheet 3
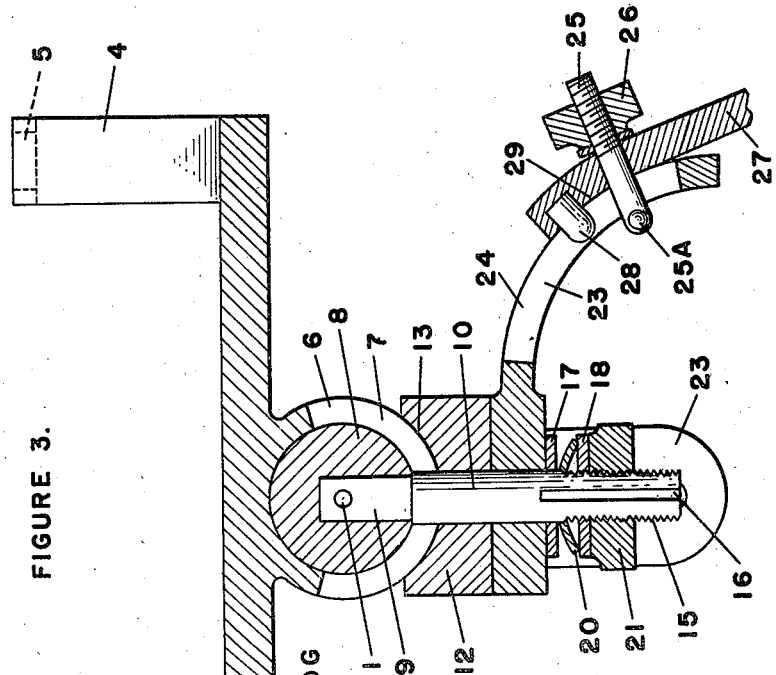
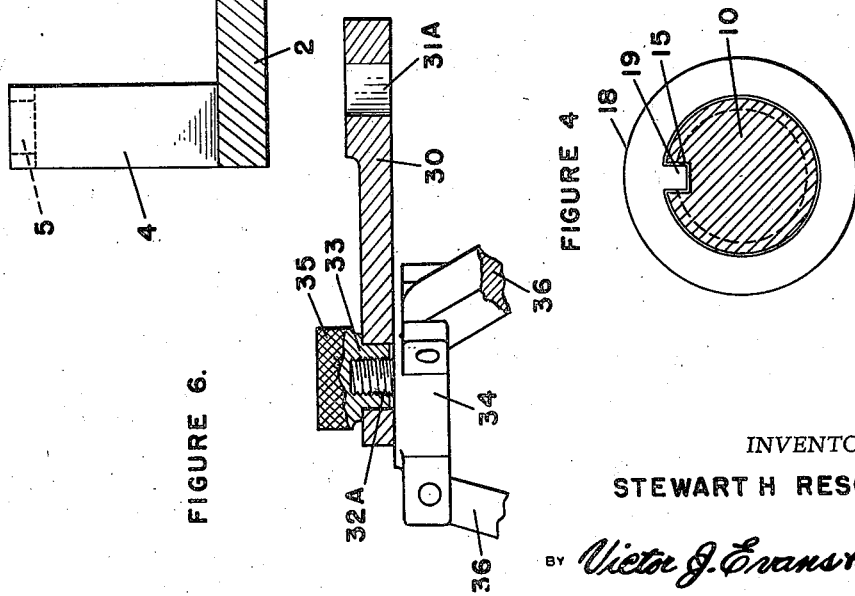
INVENTOR.
STEWART H RESCH
BY *Victor J. Evans & Co.*
ATTORNEYS Patented July 29, 1947

2,424,708

UNITED STATES PATENT OFFICE 2,424,708

TELESCOPE MOUNT

Stewart H. Resch, Temple, Pa.

Application June 13, 1945, Serial No. 599,222

2 Claims. (Cl. 248—183)

My present invention, in its broad aspect, has reference to improvements in substantially universally adjustable mounts for telescopes and the like, so that the instrument supported by the mount may be sighted and moved in any direction without removing the eye from the eyepiece, or the like. More particularly, it is my purpose to provide an improved support for the instrument, and to which the instrument may be quickly attached and detached, and an improved substantialy universally movable and adjustable connection of the same to the head of an improved stand or tripod. I also provide an improved leg mounting for the stand or tripod. My mount may also be used for cameras and the like, but the preferred embodiment illustrated herein is primarily for use with telescopes and is particularly adaptable for use with riflemen and the like.

Other and equally important objects and advantages of my invention will be apparent from the following description and drawings, and it is pointed out that changes in form, size, shape, materials, and construction and arrangement of parts is permissible and within my broad inventive concept and the scope of the appended claims.

In the drawings wherein I have illustrated a preferred form of my invention—

Figure 1 is a side elevation;

Figure 2 is a top plan view;

Figure 3 is a section on the line 3—3 of Figure 2;

Figure 4 is a section on the line 4—4 of Figure 1;

Figure 5 is a modified form of base (shows both a top plan and an edge view) so that the unit can be used on a camera tripod.

Figure 6 is a section showing a further modified form of the base attached to a camera tripod.

In the drawings, wherein like characters of reference are used to designate like or similar parts—

The numeral 1 designates the elongated telescope support which has a body or base plate 2 formed with lateral extensions 3 at each end in the form of a T, and each extension provided with an upwardly extending arm 4 having a slot or bore 5 through which straps are adapted to extend to hold the instrument on the support. Midway the ends of the base or body 2 is a hollow cylindrical extension 6 formed with an upwardly extending slot 7. A cylindrical bearing element 8 is mounted in the extension and is provided with a bore in which the reduced end 9 of a supporting rod 10 is pinned as at 11. The rod fits in the slot 7 and extends downwardly through a bore in the washer 12 which has an arcuate depression 13 to receive the extension 6. The washer seats on the top of the head 14 of the tripod or stand, and the rod extends downwardly through an opening in the head and is threaded as at 15 and has a longitudinal slot 16. A pair of washers 17 and 18 having lugs 19 fitting in the slot 16 have mounted therebetween a domed spring washer 20, and a nut 21 is mounted on the rod and bears against the washers to exert a drag on the turning movement of the rod. Formed on the stand or tripod head 14 are arcuate depending arms 23 in tripod form. Each arm has an elongated slot 24 to receive a bolt 25 with lateral lugs or extensions 25a, and on which is mounted a nut 26 to hold thereto a leg 27. Each leg has a conical pin 28 at its end fitting in the slot to hold the leg in position, and by reason of the arcuate form of the arms 23 adjustment of the legs on the arms will affect or adjust the spread of the legs. The ends of the legs are slightly arcuate as at 29 to conform to the curvature of the arms.

To adapt my device for use with a camera tripod, the base or head 14 and legs 27 are eliminated, and the base 30, shown in Figure 5 is substituted. This base has a seat 30a for washer 12, an opening 31 for the rod 10, and an opening 32 having its wall screw-threaded to adapt the base to be attached to the head of a camera tripod by the screw threaded stud of the latter. This form of base shown in Figure 6 is secured to the stud 33 of the tripod head 34 by a sleeve-nut 35. This base, designated 30a is provided at one end with a seat 30b and an opening 31a similar to the parts 30a and 31 of Figure 5. In its other end, the base is provided with an opening 32a sufficiently large to snugly receive the sleeve-nut 35. The legs of the tripod are designated 36. From the foregoing, it will be seen that the support may be turned or tilted; that the tripod legs 36 are adjustable; that a desired amount of drag is provided by the washers, and that the amount of drag is adjustable.

From the foregoing, it is believed that the objects and advantages of my invention will be apparent, but it is again emphasized that interpretation of its scope should only be conclusive when made in the light of the subjoined claims.

I claim:

1. An adjustable and movable instrument mount comprising a tripod head, arcuate arms depending from the head, legs adjustably mounted on the arms, a washer seated on the head and having an arcuate depression, an elongated support for the instrument having a slotted, hollow cylinder formed intermediate its ends and seated in the arcuate depression of the washer, a threaded supporting rod extending through the slot and through the washer and head of the tripod, a cylindrical bearing on the rod mounted in the hollow cylinder, a nut on the rod, and a plurality of washers, one of which is resilient and domed between the nut and the head.

2. The invention as defined in claim 1 wherein the slot in the cylinder extends up from the bottom of the cylinder, and wherein the rod is slidable in the slot, and the cylindrical bearing on the rod is rotatable in the cylinder, and the cylinder is rotatable on the arcuate depression of the supporting washer on the head.

STEWART H. RESCH.

REFERENCES CITED

The following references are of record in the file of this patent:

UNITED STATES PATENTS

| Number | Name | Date |
|---|---|---|
| 282,182 | Flammang | July 31, 1883 |
| 783,258 | Frenot | Feb. 21, 1905 |
| 990,025 | Willour | Apr. 18, 1911 |
| 2,128,409 | Hager | Aug. 30, 1938 |